United States Patent
Aleck

[15] 3,655,085
[45] Apr. 11, 1972

[54] FILAMENT WOUND SPHERICAL PRESSURE VESSEL

[72] Inventor: Benjamin J. Aleck, Jackson Heights, N.Y.
[73] Assignee: Arde, Inc., Paramus, N.J.
[22] Filed: Apr. 12, 1968
[21] Appl. No.: 721,019

[52] U.S. Cl. ................................................220/3, 220/83
[51] Int. Cl. ......................................................B65d 7/42
[58] Field of Search .................29/421; 156/148, 173, 175, 156/172; 220/3, 83

[56] References Cited

UNITED STATES PATENTS

| | | | |
|---|---|---|---|
| 2,848,133 | 8/1958 | Ramberg | 220/3 |
| 3,031,099 | 4/1962 | Wiltshire | 220/3 |
| 3,047,191 | 7/1962 | Young | 220/3 X |
| 3,083,864 | 4/1963 | Young | 220/83 |
| 3,112,234 | 11/1963 | Krupp | 220/3 UX |
| 3,144,952 | 8/1964 | Uhlig et al. | 220/3 |
| 3,366,522 | 1/1968 | Underwood | 156/175 X |

*Primary Examiner*—Raphael H. Schwartz
*Attorney*—Hubbell, Cohen & Stiefel

[57] ABSTRACT

A spherical, multi-layer, fibre reinforced plastic pressure vessel, each layer being a helix inclined at a different angle to the polar axis with each convolution in each layer following substantially a great circle, constructed so that the layer which extends closest to the poles of the sphere resists meridianal force of a given amount at a preselected horizontal plane, the layer most remote from the poles of said sphere resists, together with all other windings cooperating therewith, hoop force of said given amount along the equator, and the intermediate layers resist, together with the layers cooperating therewith, at selected horizontal planes only, either a meridianal force or a hoop force of said given amount.

17 Claims, 5 Drawing Figures

PATENTED APR 11 1972

INVENTOR
BENJAMIN J. ALECK
BY
Hubbell, Cohen & Seifel
ATTORNEYS.

INVENTOR
BENJAMIN J. ALECK

BY
*Hubbell, Cohen & Stiefel*
ATTORNEYS.

FILAMENT WOUND SPHERICAL PRESSURE VESSEL

BACKGROUND OF THE INVENTION

1. Field of the Invention

This invention relates to spherical fibre reinforced plastic pressure vessels.

2. Description of the Prior Art

Spherical fibre reinforced plastic pressure vessels are known. Generally speaking, the fibre reinforcement is wound in a random pattern in the hope of yielding a vessel having substantially uniform resistance to meridianal and hoop forces throughout. Some attempt has been made to wind vessels utilizing a multiplicity of layers, each layer being in the form of a helix, the convolutions of which follow substantially great circle paths, but the method of constructing such vessels has been highly empirical, with no reliable theoretical foundation, and the vessels so constructed have been inefficient.

SUMMARY

The helical winding layer extending closest to the poles of the sphere (that is the layer having its convolutions extending about the sphere at the most acute angle of inclination ($\alpha$) to the polar axis) is constructed, in accordance with mathematical expressions, to resist a given amount of meridianal force at an analytical plane perpendicular to the polar axis which intersects the surface of the sphere at a given angle to the polar axis ($\alpha_2$). The winding layer next closest to the poles of the sphere is wound at an angle to the vertical of $\alpha_2$ and is constructed to resist, together with the first winding, at an analytical plane perpendicular to the polar axis which intersects the surface of the sphere at a selected angle to the polar axis of $\alpha_3$ said given amount of meridianal force. The layer next closest to the poles of the sphere is then constructed with convolutions disposed at an angle to the vertical equal to $\alpha_3$ and is designed to resist, together with the contributions from the first two windings, a meridianal force of said given amount at still another analytical plane perpendicular to the polar axis which intersects the surface of the sphere at an angle to the polar axis of $\alpha_4$. The procedure may be continued for all additional winding layers save the layer (layer $m$) whose windings are most remote from the poles. Layer $m$ will have its windings disposed to the vertical at an angle $\alpha_m$ but will be constructed to resist at the diametral plane, together with all other windings, a hoop force of said given amount. Apart from the arbitrarily selected analytical planes no attempt is made to construct the vessel so that it uniformly resists throughout its entire surface both meridianal and hoop forces, this being taken care of by deformation of the completed vessel itself under pressure.

DESCRIPTION OF PREFERRED EMBODIMENTS

Figure 1:
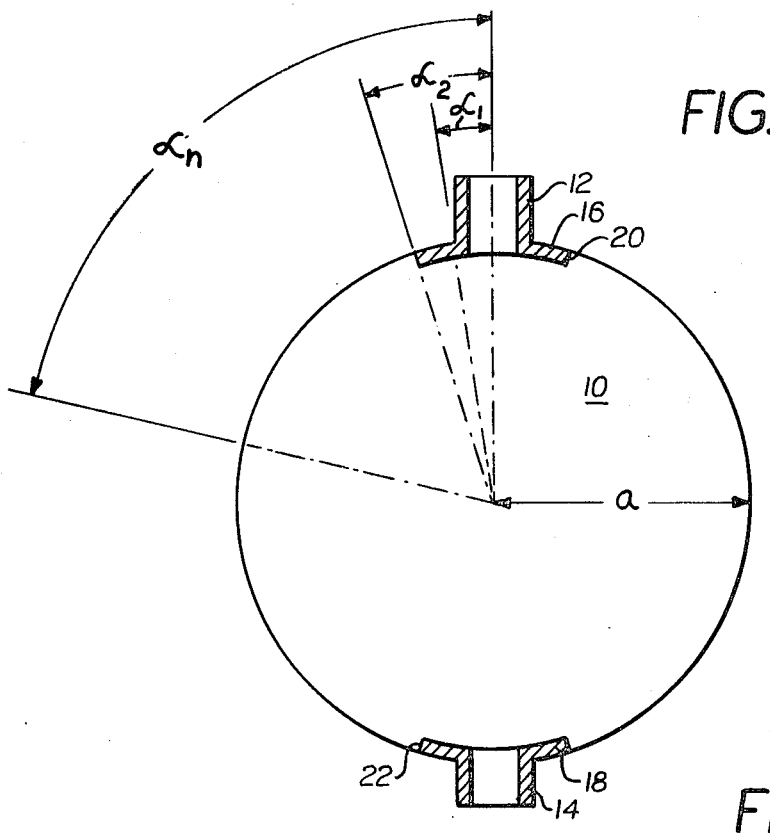
FIG. 1 is a sectional view of a spherical mandrel with boss hardware disposed thereon ready to receive filament windings in accordance with the present invention.

The present method is directed to a multi-layer filament wound spherical pressure vessel, each layer of which is in the form of a tight helix with each convolution in each layer following substantially the path of a great circle (the deviation from a true great circle path being as a result of the pitch of the helix). It can be shown for any such layer (e.g., a layer 1) that the following equations are true:

$$P_{f_1} = \frac{N_1 T}{\pi a^2 \sqrt{\sin^2 \eta - \sin^2 \alpha_1}} \quad (1)$$

$$N_{\phi_1} = \frac{1}{\sin^2 \eta} \cdot \frac{N_1 T}{\pi a} \sqrt{\sin^2 \eta - \sin^2 \alpha_1} \quad (2)$$

$$N_{\theta_1} = \frac{1}{\sin^2 \eta} \frac{N_1 T}{\pi a} \frac{\sin^2 \alpha_1}{\sqrt{\sin^2 \eta - \sin^2 \alpha_1}} \quad (3)$$

wherein:

$P_{f_1}$ is the radial pressure which the layer of fibres at tension T would exert on a spherical mandrel;

$N_1$ is the number of turns in the layer under consideration;

T is the maximum tension to which the filaments in the layer are to be subjected and is therefore constant;

$a$ is the radius of the sphere being formed;

$\eta$ is an angle to the vertical axis at which an arbitrarily selected plane perpendicular to the polar axis intersects the surface of the sphere being formed;

$\alpha_1$ is the angle at which the windings or convolutions in the layer under investigation are disposed to the vertical;

$N_\phi$ is the resistance in pounds per inch to tensile force in the meridianal direction tending to pull the sphere apart along a plane perpendicular to the polar axis of the sphere; and $N_\theta$ is the resistance in pounds per inch to tensile force operating along a parallel of the sphere (i.e., perpendicular to the polar axis) tending to pull the sphere apart along a plane parallel to or including the polar axis.

In a multi-layer structure, the contribution of each layer to resistance to meridianal and hoop stresses at any given plane on the surface of the sphere is additive with the contribution of each other layer intersecting said plane. Thus, for example, if there is a two layer structure, to determine the total resistance to meridianal force per unit length of parallel which both layers can withstand ($N_{\phi_t}$) equation (2) above would have to be rewritten as:

$$N_{\phi_t} = \frac{T}{\sin^2 \eta \, \pi a} [N_1 \sqrt{\sin^2 \eta - \sin^2 \alpha_1} + N_2 \sqrt{\sin^2 \eta - \sin^2 \alpha_2}] \quad (4)$$

Obviously, the equations (1) and (3) for two layer structures could be rewritten in a similar manner. Thus it can be shown that in a structure having m layers wound in accordance with the above described great circle helical pattern that $$P_{f_t} = \sum_{i=1}^{i=m} \frac{N_i T}{\pi a^2 \sqrt{\sin^2 \eta - \sin^2 \alpha_i}} \quad (5)$$

$$N_{\phi_t} = \frac{T}{\sin^2 \eta \, \pi a} \sum_{i=1}^{i=m} N_i \sqrt{\sin^2 \eta - \sin^2 \alpha_i} \quad (6)$$

$$N_{\theta_t} = \frac{T}{\sin^2 \eta \, \pi a} \sum_{i=1}^{i=m} N_i \frac{\sin^2 \alpha_i}{\sqrt{\sin^2 \eta - \sin^2 \alpha_i}} \quad (7)$$

where $i$ is the number of any given layer and ranges from 1 to $m$.

It will be obvious that irrespective of the angle to the vertical which locates a plane selected for analytical purposes ($\eta$), if the sphere were one hundred per cent efficient, $N_{\phi_t}$ would be constant and $N_{\theta_t}$ would be constant and, preferably, $N_{\phi_t}$ would equal $N_{\theta_t}$. To satisfy these conditions would appear to be mathematically impossible in that such satisfaction requires the simultaneous satisfaction for each layer of two equations (6) and (7) and there is only one unknown which may be varied to accomplish this, namely the number of turns in the winding layer ($N_i$). This apparently insurmountable problem has been solved in the present method by making certain assumptions which experimentation has proved to be highly satisfactory.

Specifically, one assumption is that if the requirements of equation (6) above at a given number of arbitrarily selected analytical planes which intersect the surface of the sphere at angles to the polar axis which vary from zero to 90, are met for a desired value of $N_{\phi_t}$, the value of $N_{\phi_t}$ at the planes in between those selected for analytical purposes will take on satisfactory values. A second assumption is that if the requirements to achieve a substantially constant $N_{\phi_t}$ are met throughout the vessel, the requirements for achieving a substantially constant $N_{\theta_t}$ are also met. As will be seen hereinafter, the second assumption preferably includes one modification; namely, that in the equatorial region of the sphere where the layer most remote from the poles is layed down, that is the $m$ layer, the requirements of this layer with respect to the number of windings, that is $N_m$, are satisfied not with respect to $N_{\phi_t}$ but instead with respect to $N_{\theta_t}$.

A detailed analysis indicates that a vessel designed utilizing the equations (6) and (7) above and the assumptions expressed above will yield a vessel THAT will maintain a substantially spherical shape. However, it can be shown that the assumptions are only good approximations and that $N_{\phi_t}$ and $N_{\theta_t}$ do vary over the surface of the sphere when under pressure. This variation is so small that all that results therefrom is that the ideal spherical shape of the vessel becomes somewhat altered when the vessel is pressurized, the alteration taking the form of the appearance of small peaks and valleys in the spherical surface, which peaks and valleys compensate for the actual variations arising from the design assumptions.

Figure 3:
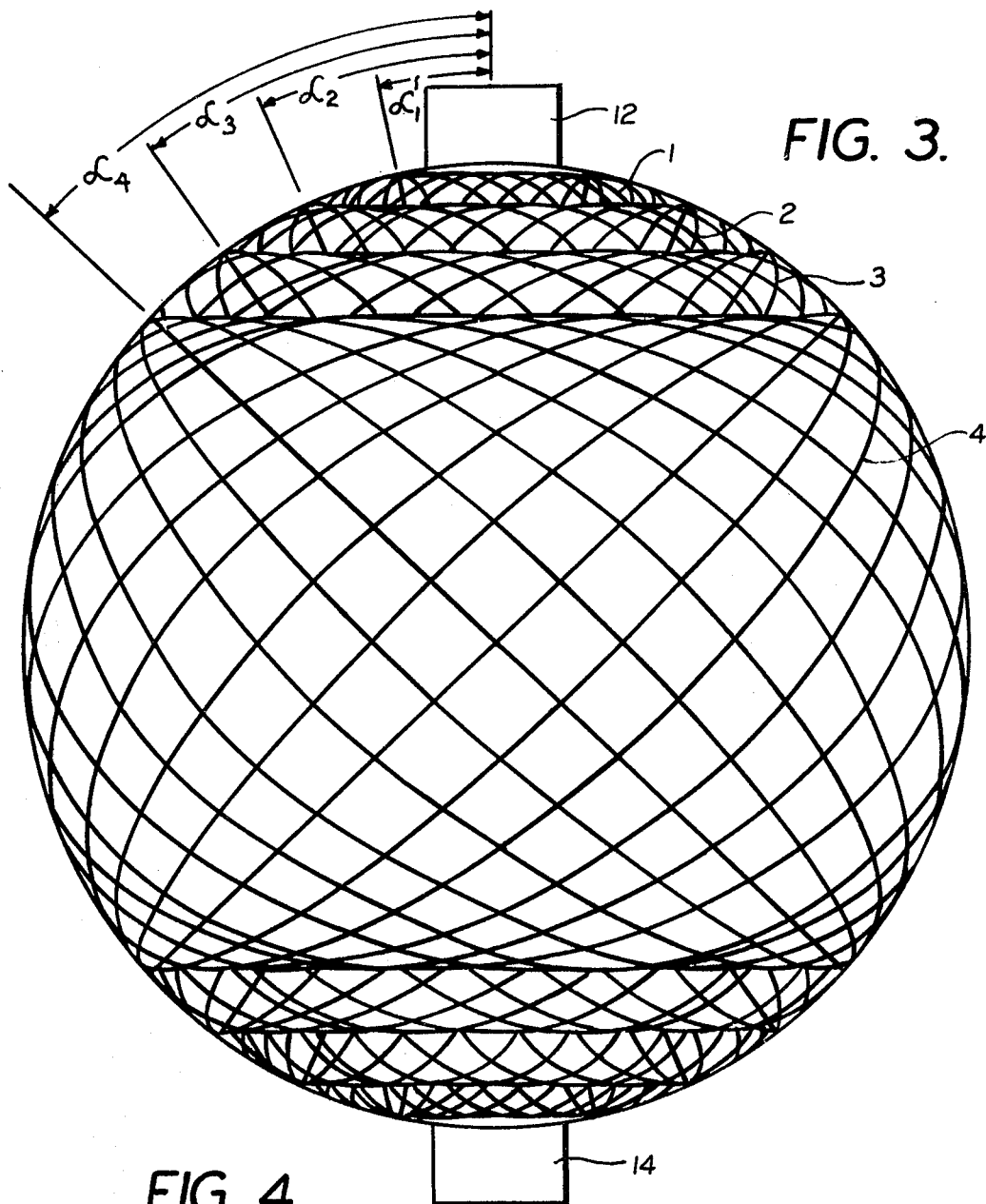
FIG. 3 is a broken elevational view of the vessel partially wound.

Turning our attention now to the drawings in detail, the vessel to be formed by the present invention is preferably wound on a mandrel 10 having a radius $a$. The mandrel may be a hollow metal sphere or the like although preferably, in the present invention, the mandrel is a dissolvable mandrel such as a salt mandrel. As the vessel to be formed is a pressure vessel, it is obvious that it must have at least an inlet-outlet 12 although, as shown in FIGS. 1 and 3, the vessel has an inlet 12 and an outlet 14 of substantially identical configuration. As shown in the drawings, the inlet 12 and the outlet 14 are both cylindrical tubes and each is provided with a flange 16 and 18 of certain proportions to be described hereinafter in greater detail. Naturally other shapes of hardware may be employed. As here shown, and as is preferred, the surface of the mandrel 10 is contoured in order to render it complementary to the flanges 16 and 18 in order to present a substantially spherical outer surface for winding the vessel thereon. The contour cutouts or surface depressions for the flanges 16 and 18 are designated in FIG. 1 by the reference numerals 20 and 22.

Figure 2:
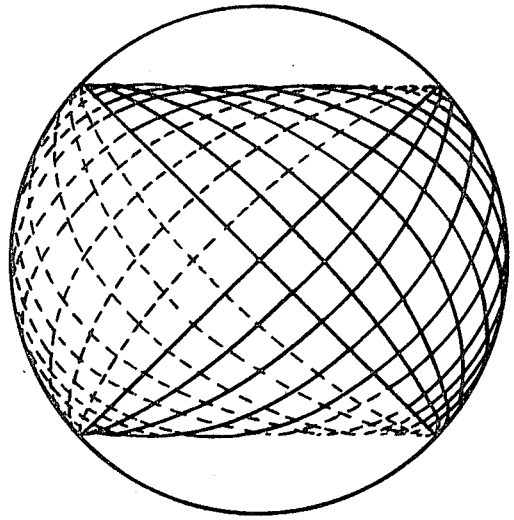
FIG. 2 is an elevational view showing a few turns of one winding layer.

As already stated, each of the winding layers to be formed to make the present vessel is to be in the form of a helix with each turn thereof following substantially a great circle of the sphere to be formed, the variation from a true great circle being the result of the pitch of the helix (FIG. 2). To form the first winding layer, which layer is designated by the reference numeral 1 in FIG. 3, it is preferred to pitch the layer so that the upper and lower edges thereof run tangent to the exterior of the tube 12. Thus $\alpha_1$, that is the angle of inclination of the first layer to the vertical, is preferably determined by the physical dimensions of the inlet 12 and, if included, the outlet 14. Now, in view of the fact that winding number 1, which, as shown, is the winding which extends closest to the poles of the sphere, provides the sole resistance to meridianal force in the area on the polar sides of the second layer, $N_{\phi_1}$ must be equal to $N_{\phi_t}$ which is an arbitrarily preselected value that preferably is equal to $p\,x(a/2)$, wherein $p$ is the maximum pressure to which the vessel will be subjected. Moreover, it is possible to fix the angle of the plane perpendicular to the polar axis at which winding 1 will afford the maximum resistance to meridianal force. This plane intersects the spherical surface at an angle $\eta$ that will subsequently be assigned as the value of $\alpha_2$. The equation to determine $\alpha_2$ is $$\alpha_2 = \sin^{-1}(\sqrt{2}\sin\alpha_1) \quad (8)$$

Now equation (2) can be solved for $N_1$. Once $N_1$ is known, all of the parameters for the first winding are known. Therefore, a curve can be plotted to determine the contribution of winding 1 to resistance to meridianal force at various planes of analyses, that is at various $\eta$, which curve is shown in solid lines in FIG. 4.

It will be seen that in the polar area between $\alpha_1$ and $\alpha_2$ the $N_\phi$ contribution of winding 1 is less than the predetermined value of $N_{\phi_t}$. Since no additional winding will be provided in the polar region between $\alpha_1$ and $\alpha_2$, means must be provided for yielding additional resistance to meridianal force. This means is the flanges 16 and 18 on the inlet 12 and the outlet 14, respectively. These flanges are preferably metal and are proportioned with respect to thickness and the nature of their material to provide additional $N_\phi$ in the polar region to make sure that the polar region does not fail in meridianal stress.

Figure 4:
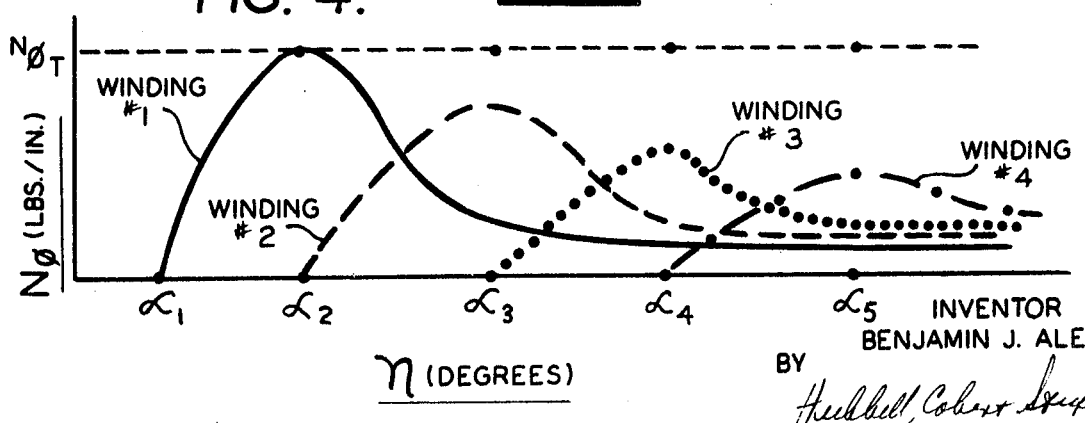
FIG. 4 is a series of curves for several windings showing the relationship between resistance to meridianal force in pounds per inch versus the location of the analytical plane.

Turning our attention now to the second winding, that is winding 2, $\alpha_2$ is already established as above described. However, inorder to determine the number of turns in winding 2, that is $N_2$, an assumption must be made with respect to the value of $\alpha_3$. That is to say, it is known that the third winding, winding number 3, will contribute no $N_\phi$ at $\alpha_3$. Thus if equation (4) is solved where $\eta$ is assumed to be $\alpha_3$ the value of $N_2$ can be calculated, as there are no other unknowns in the equation. Thus $N_{\phi_t}$ is known as it has been preselected, $N_1$ is known as it has been previously calculated, $\alpha_1$ is known as determined above, and $\alpha_2$ is known. In order to select $\alpha_3$ to fulfill the final missing unknown in the equation save for the value of $N_2$ itself, certain practical considerations must be taken into account. Thus, if $\alpha_3$ is too close in size to $\alpha_2$, then the number of windings to form the entire vessel will be increased and this will increase the complexity of the winding operations which is undesirable. However, if $\alpha_3$ is unduly large there will be substantial variations in the actual $N_{\phi_t}$ between $\alpha_2$ and $\alpha_3$ as contrasted with the theoretical constant value throughout, and these variations at some practical point become undesirable. I have found that a practical number of windings to yield a desirable vessel falls somewhere in the range of 10 to 14 for most applications. Assuming as a first approximation that the difference in adjacent $\alpha$'s is substantially uniform throughout, a reasonable approximation of $\alpha_3$ can be made. Once $\alpha_3$ has been assumed or approximated as above described, equation (4) may be solved to determine $N_2$. If the solution of the equation (4) for $N_2$ yields a positive number, then the assumption for $\alpha_3$ is a workable assumption and the calculation may be employed. If, however, the solution yields a negative number for $N_2$, which solution would indicate that with the assumed value of angle $\alpha_3$, the second layer should have a negative number of turns in order to yield an $N_{\phi_t}$ equal to the desired value, then it becomes clear that the selection for $\alpha_3$ is wrong in that it is too small an angle and an adjustment in the assumption must be made to enlarge the assumed value of angle $\alpha_3$, whereupon the calculation of $N_2$ is repeated. Once the solution of equation (4) yields a positive value for $N_2$, then the parameters for winding 2 are established in that the angle of inclination of the convolutions to the vertical ($\alpha_2$) is is determined, and the number of turns in the second winding ($N_2$) is also determined. While the plotting of the curves of FIG. 4 are unnecessary to this analysis, if desired, the $N_{\phi_2}$ versus $\eta$ curve can be plotted and it would appear as shown in FIG. 4 in dashed line.

Turning our attention now to winding number 3, a similar procedure may be employed to determine the number of turns ($N_3$) in winding number 3 as was employed above to determine the number of turns ($N_2$) in winding number 2. Specifically, the summation form of the equation for $N_{\phi_t}$ above set forth as equation number (6), may be written where only three windings (1, 2 and 3) are present in accordance with the following equation:

$$N_{\phi_t} = \frac{T}{\sin^2\alpha_4\,\pi a}[N_1\sqrt{\sin^2\alpha_4 - \sin^2\alpha_1}$$
$$+ N_2\sqrt{\sin^2\alpha_4 - \sin^2\alpha_2} + N_3\sqrt{\sin^2\alpha_4 - \sin^2\alpha_3}] \quad (9)$$

Equation number (9) is presented with $\eta$ already assumed to be $\alpha_4$. This assumption facilitates the calculation as it eliminates winding 4 from consideration in arriving at the parameters for winding 3 in the same way that $\eta$ was selected to be $\alpha_3$ in the solution of equation (4) for $N_2$. Again, some arbitrary value for $\alpha_4$ must be assigned prior to the solution of the equation (9) for $N_3$. The factors determining the selection of $\alpha_4$ are the same as those set forth above with respect to $\alpha_3$ and when a selection or first approximation for the value is made, equation (9) is readily solvable for $N_3$. Again, if $N_3$ should prove to be a positive number then the assumption as to the value of $\alpha_4$ is a useful and workable one and the calculations may be adhered to. Of course, with the assumption, if the value of $N_3$ should prove to be negative, then it is obvious that $\alpha_4$ has been chosen to be too close to the angle $\alpha_3$ and it must be enlarged. Again, as was true in the solution of $N_2$, it will be seen that the solution of the equation for $N_3$ is made by analyzing the sphere at a very convenient plane, namely the plane at which the contribution of winding 4, the next winding to be wound after winding 3, will be zero, whereby to enable the designer to ignore the contribution of winding 4 in calculating the number of turns in winding $N_3$. The manner of determining the parameters of the remaining windings 4, 5, 6 . . . save for the winding most remote from the poles, that is winding $m$, is precisely as that described above with respect to the second and third windings, and is a mere application of equation (6) presented above. The manner of solving the parameters of winding $m$ will be described below.

It should be noted that the sphere has been redesigned to yield constant $N_{\phi_t}$ only at a preselected number of planes and no attempt has been made to determine whether the actual $N_{\phi_t}$ at other analytical planes, that is at planes perpendicular to the polar axis which intersect the spherical surface at other angles $\eta$, would be equal to the $N_{\phi_t}$ chosen for the particular sphere. However, a review of the data and an observation of the results of the of the design method indicate that there is not substantial variation in $N_{\phi_t}$ over the entire surface of the sphere if the sphere is constructed in accordance with the method.

Moreover, it should be noted that throughout the description to this point, no attempt has been made to determine whether $N_{\theta_t}$, that is the hoop strength of the sphere, is constant throughout and whether it is equal to the meridianal strength of the sphere in order to yield a substantially 100 percent efficient vessel. The reason for the absence of such calculations is the assumption previously mentioned that when the vessel is designed for a constant $N_{\phi_t}$, a substantially constant $N_{\theta_t}$ will result and $N_{\theta_t}$ will be substantially equal to $N_{\phi_t}$.

However, in order to insure that the hoop strength of the sphere does meet the design requirements for a highly efficient vessel, the winding with the maximum $\alpha$, that is the winding $m$, is preferably designed to satisfy the requirements of equation (7) and not of equation (6). That is to say equation (7) is rewritten as $$N_{\theta_t} = \frac{T}{\sin^2 \eta \, \pi a} \left[ N_1 \frac{\sin^2 \alpha_1}{\sqrt{\sin^2 \eta - \sin^2 \alpha_1}} + N_2 \frac{\sin^2 \alpha_2}{\sqrt{\sin^2 \eta - \sin^2 \alpha_2}} \right.$$
$$\left. + N_3 \frac{\sin^2 \alpha_3}{\sqrt{\sin^2 \eta - \sin^2 \alpha_3}} + \ldots N_m \frac{\sin^2 \alpha_m}{\sqrt{\sin^2 \eta - \sin^2 \alpha_m}} \right] \quad (10)$$

In solving equation (1) for $N_m$, $\eta$ will be chosen to be 90° in order to determine that the hoop strength at the diametral plane of the vessel is equal to $N_{\theta_t}$ is equal to $N_{\phi_t}$. Thus in equation (10) the value of $\sin^2\eta$ will be 1. It will be obvious that between the expression in the equation beginning with $N_3$ and the expression in the equation beginning with $N_m$ may appear a number of additional expressions similar to those already presented but for the other windings in the vessel. However, all of the parameters for these windings will be known (having been arrived at by the previously described procedure) and the entire equation (10) is readily solvable for $N_m$ in order to yield a winging $m$ which will yield the proper hoop strength for the vessel in the equatorial area. This gives added assurance that the vessel will be a highly efficient one.

Utilizing the design procedures above described, a highly satisfactory pressure vessel has been wound in accordance with the present invention to yield a vessel with a radius ($a$) of 6.75 inches and the ability to withstand a pressure of 6,530 psi. Such a vessel was formed of Owens Corning S-994 fiberglass prepreged with U.S. Polymeric E790 epoxy resin with the allowable tensile stress on the filaments (T) being 290,000 psi. Such a vessel had the following winding pattern:

| Winding Number | Angle Inclination ($\alpha$) | Number of Windings (N) |
| --- | --- | --- |
| 1 | 9.0 | 1100 |
| 2 | 13.5 | 475 |
| 3 | 23.55 | 520 |
| 4 | 30.95 | 437 |
| 5 | 37.45 | 377 |
| 6 | 43.55 | 336 |
| 7 | 49.60 | 305 |
| 8 | 55.85 | 280 |
| 9 | 62.7 | 263 |
| 10 | 71.1 | 151 |
| 11 | 76.5 | 186 |
| 12 | 81.0 | 112 |

The winding layers were wound one at a time and after the complete vessel had been formed it was subjected to the curing temperature for the epoxy resin carried by the prepreged fiber glass to cause the resin to form a substantially continuous rigid matrix for the filament winding. After the resin had been set or cured, water was introduced into the interior of the vessel through the inlet 12 to dissolve and flush out the salt mandrel whereby to yield the desired vessel.

It will be obvious that the plastic need not be incorporated in the vessel being formed as a coating on the filament winding although this is highly desirable. Thus uncoated reinforcing filament such as fiber glass could be employed and after the winding layers are formed, the winding layers could be impregnated with liquid polymeric material as by spraying or brushing, and thereafter the plastic could be cured. Moreover, as is well known in the art, it is not necessary that the plastic be epoxy, although this is desirable. For example, any rigid or semi-rigid thermoplastic or thermosetting plastic material such as, for example, ABS (acrylonitrile, butadiene, styrene) plastic; acrylic plastic such as polymethyl methacrylate; polystyrene; vinyl plastics, urea-formaldehyde condensates; phenol-formaldehyde condensates; polyoxymethylene plastics; or polyolefins; etc., may be employed. The epoxy resin used in the specific example is a condensate of epichlorhydrin and bis phenol A, although other epoxies could be employed.

While fiberglass is the preferred reinforcement due to its high tensile strength, it will be obvious to anyone skilled in the art that other types of reinforcing filaments can be employed within the present invention. Thus, any of the well known continuous filaments, whether synthetic or natural, may be employed, including, by way of example, polyamides, such as polyhexamethylene adipamide and polycaproamide; polyesters, such as ethylene terephthalate polymers and copolymers; acrylic polymers and copolymers such as polyacrylonitrile; vinyl polymers such as polyvinyl alcohol, polyvinyl chloride and polyvinylidene chloride; fluorinated ethylene polymers such as polytetrafluoroethylene and polytrifluoromonochloroethylene; polyhydrocarbons such as linear polyethylene, linear polypropylene and copolymers of ethylene with other polymerizable monomers; regenerated cellulose; cellulose acetate; polyurethanes; and the like.

In addition, biconstituent filaments made up of polyamid and polyester, e.g., nylon polyester or the like, may be employed. Such biconstituent filaments are produced commercially, for example, by Allied Chemical under the trade name "EF-121." (Frequently such biconstituent filaments of nylon-polyester are referred to as "merged filaments.") Generally, these filaments are obtained by the simple expedient of melt mixing polyamide and polyester, e.g., nylon and polyethylene terephthalate, and thereafter extruding the resulting molten mixture in filamentary form.

Such merged nylon-polyester filaments or fibers generally will contain from about 50 to 90 percent by weight of polyester. These biconstituent filaments are more fully described in the Apr. 16, 1966 issue of *Chemical Week* at page 35. See also *Chemical and Engineering News*, page 57 A, of Sept. 5, 1966.

Lastly, if desired, metal fibers and such natural fibers as silk, may be employed.

While in the preferred method above described all of the layers save the layer $N_m$ are designed by utilizing equation (6) with an eye to maintaining $N_{\phi_t}$ constant at preselected planes at angles $\alpha_2$, $\alpha_3$, etc., and only the last winding, that is the $m$ winding is designed utilizing equation (7) for hoop strength, a satisfactory vessel can be designed by aiming for a substantially constant $N_{\theta_t}$ at the various planes of analysis determined by the angles $\alpha_3$, $\alpha_4$, etc., by utilizing eaQUATION (7), and a similarly efficient vessel can be obtained. If such a procedure is elected, however, the layer closest to the polar regions, that is winding 1, should nevertheless be designed in order to yield an appropriate meridianal strength at the angle $\alpha_2$ in order to insure that the vessel is reasonably efficient in the meridianal direction as well as in the hoop direction.

Thus, as a generalization, it can be said that winding number 1, that is the winding closest to the polar region of the vessel, must be designed in accordance with the equation (6) to yield a desirable meridianal strength for the vessel in the polar region, and winding number $m$ closest to the equatorial region of the vessel must be designed in accordance with equation number (7) to yield a vessel having a desirable hoop strength. The windings in between the first winding and the $m$ winding may be designed in accordance with either equation (6) or equation (7) utilizing, of course, the assumptions and procedures above described. However, it will be obvious that to facilitate calculations, all of the windings between winding 2 and winding $m-1$ are preferably designed with respect to the same equation, that is either with respect to equation (6) or with respect to equation (7).

One exception to the above statement may be that if desired the first two windings closest to the polar region of the vessel, that is winding 1 and winding 2 may be both designed utilizing equation (6) to yield a substantially constant meridianal strength and the two windings most remote from the polar regions, that is windings $m$ and $m-1$, may both be designed by the utilization of equation number (7), that is to yield in the equatorial region substantially constant hoop strength for the vessel. In such a method, the windings 3 through $m-2$ may be designed in accordance with either equation (6) or equation (7) or any combination thereof, although, as already mentioned above, it is more desirable to utilize the same equation throughout the intermediate layers or windings.

Once the calculations for all of the windings are completed in accordance with any of the above embodiments of the invention, the mandrel is set with the bosses 12 and 14, placed as shown in FIG. 1, and layer 1 is wound at an angle of inclination of $\alpha_1$ and with a number of turns of $N_1$ as calculated. The winding may be wound by hand although it is preferred that it be wound by machine as conventional winding machines will maintain more uniform spacing of the adjacent turns in the particular winding. During winding a mild tension is applied to the filaments in order that they lay snugly on the mandrel but this tension is relieved almost immediately after removal of the mandrel if it is a dissolvable mandrel such as a salt mandrel. If the mandrel 10 happens to be a metal sphere, the amount of tension applied to the windings is of such small amount that it leaves the metal sphere forming the mandrel substantially unstressed. After winding 1 is completed, the machine is readjusted to wind the second winding pattern at an angle $\alpha_2$ and with a number of turns $N_2$. Thereafter the machine is reset for each additional winding through winding $m$. In view of the fact that a number of resettings must be made, and each of these takes time in fabrication, it is desirable to keep the number m relatively small, always, of course, taking into account the requirement for a substantially uniform $N_{\phi_t}$ and $N_{\theta_t}$ throughout the surface of the vessel. As already noted, if the number of windings, that is if the number $m$, is between about 10 and about 14, satisfactory results with a practical number of resettings can be achieved.

It will be obvious that upon completion of winding and the curing of the plastic resin, the mandrel, if removable as would be true of a salt mandrel, is dissolved by flushing water into the interior of the vessel through inlet 12. Naturally, if a metal liner is employed in the mandrel, the metal liner will remain as an integral part of the vessel.

As already indicated, the completed sphere is spherical under no stress, but when it is subject to its intended operating pressures, it will not maintain a truly spherical shape. Instead, a vessel made in accordance with the present method will under pressure deform to exhibit small peaks and valleys in its surface that are not readily visible to the naked eye. The appearance of the small peaks and valleys is the adjustment of the vessel itself to compensate for variations in $N_{\phi_t}$ and $N_{\theta_t}$ over the surface of the vessel arising as a result of the fact that the procedure for designing and making the vessel is based on assumptions that are good approximations but not perfect ones. The desirability of the method is that it yields a vessel which through these minute distortions in shape adjusts itself to correct for these variations.

Figure 5:
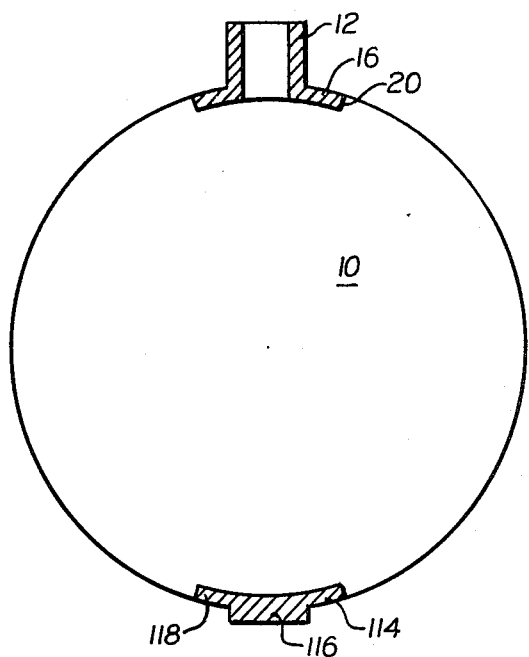
FIG. 5 is a view similar to FIG. 1 showing a modified form of hardware for the vessel.

While the description presented with respect to FIGS. 1 and 3 was with respect to a vessel having an inlet 12 and an outlet 14, a similar method may be employed where the vessel has only one portal to the interior thereof which serves at various times as an inlet and outlet. The hardware for such a vessel is shown in FIG. 5, wherein the boss 12 with its flange 16 set in a depression 20 in the surface of a salt mandrel 10 identical to the mandrel 10 of FIG. 1. However, in view of the fact that the vessel to be formed on mandrel 10 of FIG. 5 is to have only one opening, a problem arises with respect to the opposite polar regions. If symmetry is to be maintained in the winding, and this is highly desirable for practicing the present method, there would be an opening at the opposite polar region but this would render the vessel useless. There are various ways of avoiding this problem and one of them is illustrated in FIG. 5 wherein a solid concave plate 114 having a diameter and curvature equal to the diameter and curvature of flange 16 is set in the opposite polar region to the hardware 12. If desired, the central polar part designated by the reference character 116 may be slightly thickened whereas the annular remainder 118 may have precisely the same dimensions and properties as the flange 16 above. The purpose for the slight recess between the portions 116 and 118 is to provide a guide or shoulder for the first winding, that is winding 1. However, it will be obvious that such a shoulder is not necessary to practicing the present method.

It will also be obvious that such a solid disc need not be employed. In lieu thereof, if there is to be only one inlet - outlet, the vessel may nevertheless be formed with two as in FIG. 1 and then one of them may be closed as by a metal plug or the like. However, it is important in considering the present method to realize that there is no fibre in the immediate vicinity of the poles of the vessel and some form of insert to provide the necessary meridianal and hoop strength in the polar regions must be included in order to yield a useable vessel.

Throughout this description it has been assumed that the first layer to be wound on to the mandrel is winding 1 that extends closest to the poles of the sphere. It has further been assumed that each successive winding to be wound on to the mandrel is the one extending next closest to the poles and that the final winding to be placed on the mandrel is the winding m which is most remote from the polar regions. While this is the preferred method of laying down the windings, it is not the only method embodying the invention. For example, the order of laying down the windings, once the calculations have been made, could be reversed. In the alternative a relatively random selection of layers to be wound could be employed such as, for example, winding 3, winding 7, winding 5, winding 9, winding 1, etc. However, such a pattern would require more adjustment of a winding machine and would therefore not be as desirable as the preferred order described or the reverse thereof.

With the method of the type herein described, a highly efficient, fibre reinforced, spherical plastic vessel can be formed.

What is claimed is:

1. A substantially spherical filament reinforced plastic pressure vessel wherein said vessel is to withstand a preselected meridianal force of $N_{\phi_t}$ pounds per inch and a preselected hoop force of $N_{\theta_t}$ pounds per inch, said vessel including means for permitting deformation of said vessel upon pressurization thereof to exhibit throughout the entire vessel an ability at all planes perpendicular to the polar axis to withstand a substantially constant meridianal force of $N_{\phi_t}$ and at all planes parallel to said polar axis to withstand a substantially constant hoop force of $N_{\theta_t}$, said last mentioned means comprising a plurality ($m$) of helically wound layers of filament, the convolutions of which follow substantially great circle paths, each winding layer being composed of windings disposed in planes which intersect the center of the polar axis of said sphere at an angle of inclination ($\alpha$) that is different from said angle of inclination of the windings of the other of said layers, said winding layers being designated progressively from 1 to $m$ in accordance with their respective angles of inclination, said winding layer 1 satisfying the equation $$N_{\phi_t} = \frac{T}{\sin^2 \eta \, \pi a} \sum_{i=1}^{i=m} N_i \sqrt{\sin^2 \eta - \sin^2 \alpha_i}$$

wherein:
$T$ = maximum tensile stress of the filament
$\eta$ = the angle defined by the intersection of a line running from the circle of intersection of an arbitrary selected analytical plane perpendicular to the polar axis and the surface of sphere to the center of the sphere with the polar axis
$a$ = radius of sphere
$i$ = the number of the layer
$N_i$ = number of turns in the winding layer at $\eta = \alpha_2$; said winding layer ($m$) satisfying the equation $$N_{\theta_t} = \frac{T}{\sin^2 \eta \, \pi a} \sum_{i=1}^{i=m} N_i \frac{\sin^2 \alpha_i}{\sqrt{\sin^2 \eta - \sin^2 \alpha_i}}$$

at $\eta = 90°$; and windings (2) through ($m-1$) satisfying together with the windings of more acute angles of inclination, one of said two equations at analytical planes intersecting the surface of said sphere at $\eta = \alpha_f + 1$.

2. The pressure vessel of claim 1, wherein $N_{\phi_t}$ is substantially equal to $N_{\theta_t}$.

3. The pressure vessel of claim 2, wherein said windings (2) through ($m-1$) all satisfy the same equation.

4. The pressure vessel of claim 3, wherein said same equation is said first presented equation.

5. The pressure vessel of claim 2, wherein said winding (2) satisfies together with winding (1) the first presented equation at $\eta = \alpha_3$, said winding ($m-1$) satisfies together with windings (1) through ($m-2$) the second presented equation at $\eta = \alpha_m$, and the windings (3) through ($m-2$), together with the windings of more acute angles of inclination, satisfies one of said two equations at analytical planes intersecting the surface of said sphere at $\eta = \alpha_{i+1}$.

6. The pressure vessel of claim 1, wherein said filament is fiber glass.

7. The pressure vessel of claim 4, wherein said filament is fiber glass.

8. The pressure vessel of claim 7, wherein ($m$) is between 10 and 14.

9. The pressure vessel of claim 1, wherein said plastic is a substantially continuous matrix for said winding layers and is at least semi-rigid.

10. The pressure vessel of claim 7, wherein said plastic is rigid or semi-rigid and is a substantially continuous matrix for said winding layers.

11. The pressure vessel of claim 1, further comprising a flanged boss disposed at one of the poles of said sphere, said boss having a radius of, $a \sin\alpha_1$, said flange having a radius of $a \sin\alpha_2$.

12. The pressure vessel of claim 11, further comprising a second flanged boss disposed at the other of the poles of said sphere, said second boss having a radius of $a \sin\alpha_1$, the flange of said second boss having a radius of $a \sin\alpha_2$.

13. The pressure vessel of claim 11, further comprising a concave imperforate disc disposed at the other of said poles of said sphere and having a radius of $a \sin\alpha_2$.

14. The pressure vessel of claim 10, further comprising a flanged boss disposed at one of the poles of said sphere, said boss having a radius of $a \sin\alpha_1$, said flange having a radius of $a \sin\alpha_2$.

15. The pressure vessel of claim 14, further comprising a second flanged boss disposed at the other of the poles of said sphere, said second boss having a radius of $a \sin\alpha_1$, the flange of said second boss having a radius of $a \sin\alpha_2$.

16. The pressure vessel of claim 14, further comprising a concave imperforate disc disposed at the other of said poles of said sphere and having a radius of $a \sin\alpha_2$.

17. The pressure vessel of claim 14, wherein ($m$) is between 10 and 14.

* * * * *